United States Patent [19]
Minue

[11] Patent Number: 5,212,363
[45] Date of Patent: May 18, 1993

[54] TORCH FOR REMOVING STEAM GENERATOR TUBES

[75] Inventor: Gregory M. Minue, Menomonee Falls, Wis.

[73] Assignee: The Babcock & Wilcox Company, New Orleans, La.

[21] Appl. No.: 783,598

[22] Filed: Oct. 28, 1991

[51] Int. Cl.⁵ .............................................. B23K 9/167
[52] U.S. Cl. .................................... 219/75; 219/60 R
[58] Field of Search ................. 219/60.2, 61, 75, 60 R

[56] References Cited

U.S. PATENT DOCUMENTS 4,571,475  2/1986  Rabe .................................... 219/60.2
4,821,943  4/1989  Gaudin et al. ...................... 219/60.2

Primary Examiner—Clifford C. Shaw
Attorney, Agent, or Firm—Robert J. Edwards

[57] ABSTRACT

A torch assembly for TIG relaxing an inner surface of a tube to be removed from a tube sheet which comprises a conductive base containing passages for cooling water and for inert gas. A sheath is rotatably mounted to the base and contains a drive shaft fixed to the base. A torch head is fixed to an opposite end of the drive shaft and the drive shaft is embraced by a conductive braid so that electrical power applied to the base is conveyed to the torch head. A torch tip extends radially from the torch head and is used to strike an arc with the inner surface of the tube to be TIG relaxed. Inert gas is supplied through the sheath and to a space around the head which is confined by a gas cap. A hole in the gas cap receives the end of the torch tip so that inert gas bathes the annular space around the tip to protect the arc.

10 Claims, 3 Drawing Sheets

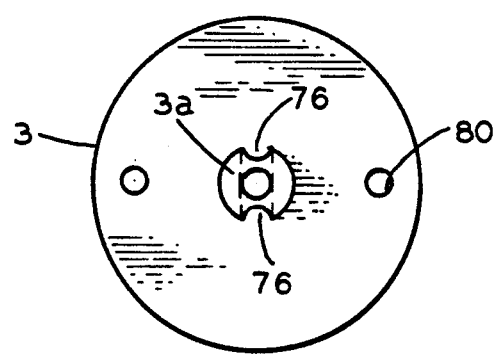
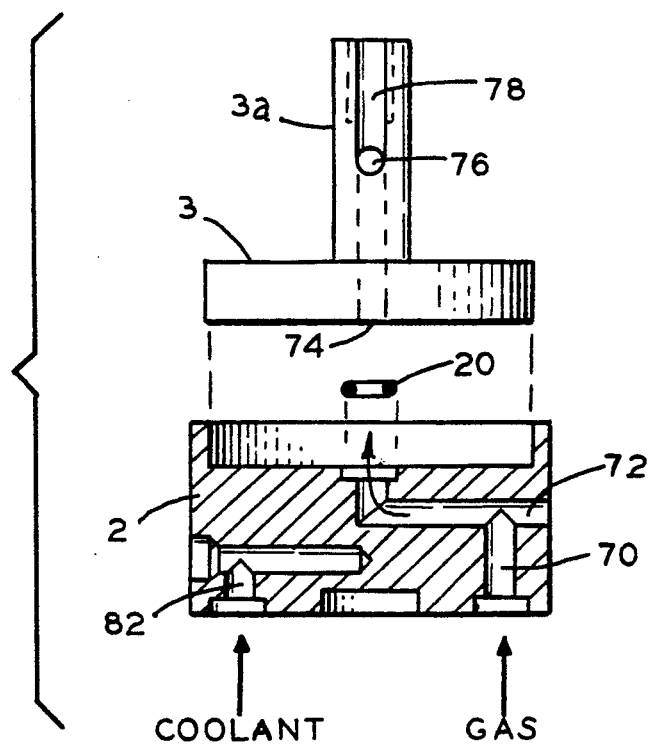

TORCH FOR REMOVING STEAM GENERATOR TUBES

FIELD AND BACKGROUND OF THE INVENTION

The present invention is generally related to welding torches and more particularly to flexible welding torches.

In nuclear steam generators, the tubes are expanded at the level of their tube sheets to form a tube to tube sheet weld. After the steam generator has been in service for a certain period of time, the steam generator and tubes must be examined for the presence of defects that may have occurred during use. The detection of defects in a tube may require the tube, or a portion of the tube, to be removed to allow for closer inspection of the tube defects and/or for replacement of the tube. By relaxing the tube expansion, removing the tube to tube sheet weld, and cutting the tube to the sample length desired, the tube sample can be removed using a hydraulic jacking sequence. The preservation of any tube defects is vital during the removal of the tube sample. Therefore, it is advantageous to reduce the amount of pull force necessary to remove the tube sample. The most common way of accomplishing this is by making various passes such as vertical, spiral, and zig-zag passes on the inner diameter of the tube with a torch. The melting of the tube inner diameter and subsequent solidification causes the tube to contract and pull away from the tube sheet. A tungsten insert gas (TIG) torch is the most suitable type of torch for insertion into a tube and for producing the necessary heat. TIG torches presently known in the industry require 24 to 42 inches of vertical clearance. This presents a problem when tube samples must be removed from the periphery of the tube sheet since the curvature of the steam generator head provides a limited vertical space. Also, some known TIG torch assemblies require the entry of personnel into the steam generator to position the weldhead on the tube sheet. This is undesirable due to the increased radiation exposure.

Accordingly, there exists a need for a TIG torch assembly that requires little vertical clearance and that can be remotely positioned along the tube sheet after it has been placed inside the steam generator.

SUMMARY OF THE INVENTION

The present invention addresses the above need in a straightforward manner. What is provided is a flexible TIG torch assembly that requires little vertical clearance and may be attached to remotely operated tooling for positioning inside the steam generator.

Accordingly, an object of the present invention is to provide a torch assembly, comprising a base containing an inert gas passage and a coolant passage, the base being adapted for connection to a weldhead for supplying electrical power, a coolant and an inert gas to the base, a sheath mounted for rotation to the base and defining an elongated interior conduit space extending in the sheath for rotation relative to the sheath, the inert gas passage of the base communicating with the conduit space around the drive shaft for conveying inert gas around the drive shaft, a gas cap rotatably mounted to an end of the sheath opposite from the base, the gas cap communicating with the conduit space for receiving inert gas from the base, and a torch tip fixed to an end of the drive shaft spaced away from the base and engaged within the gas cap, the base, shaft and tip being electrically connected to each other for conveying electrical power from the base to the tip to strike a torch arc at the tip, the gas cap having an opening through which the tip extends for supplying inert gas around an arc struck at the tip, the base, drive shaft, cap and tip being rotatable as unit for movement inside a tube.

A further object of the present invention is to provide a torch assembly including centering spring means near the gas cap for centering the sheath and gas cap in a tube.

A still further object of the present invention is to provide a flexible electrically conductive braid around the shaft and in the sheath.

A still further object of the present invention is to provide a torch assembly which is relatively short in extent so that it can be used to remove tubes from a tube sheet, even when they are near the curved vessel wall containing the tube sheet.

Another object of the invention is to provide a torch assembly which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is an exploded view of a torch assembly base and base coupling utilized in the present invention; and FIG. 4 is front elevational view of the base coupling.

DESCRIPTION OF THE PREFERRED EMBODIMENT

Figure 1:
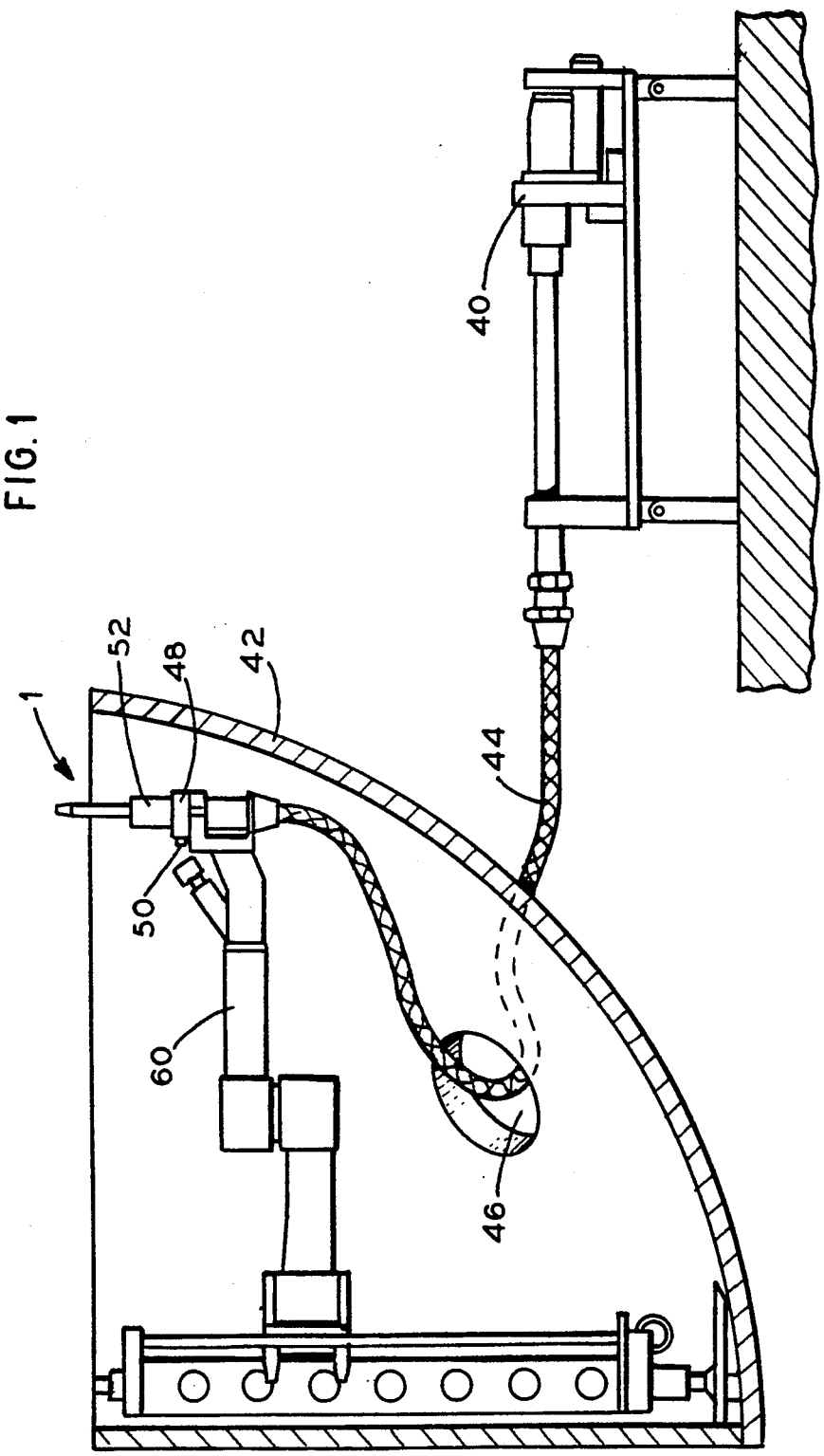
FIG. 1 is a schematic diagram illustrating the setup and apparatus used with the present invention.
Figure 2:
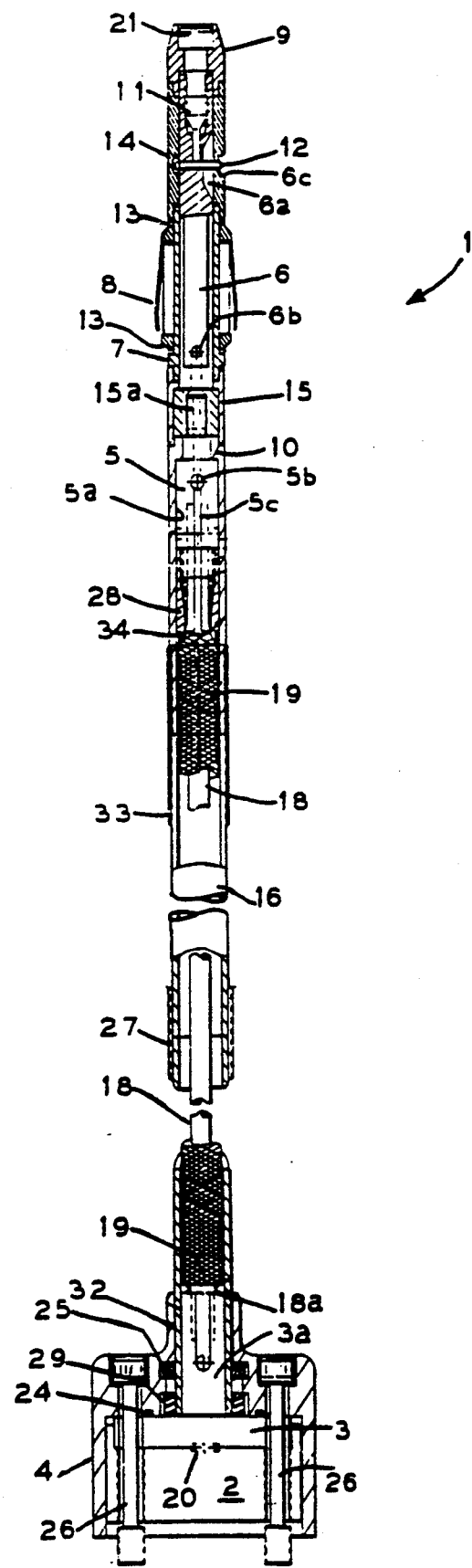
FIG. 2 is a longitudinal sectional view of the torch assembly, which is partly in elevation and with portions cut away.

Referring to the drawings in particular, the invention embodied therein comprises a torch assembly generally designated 1 and illustrated in FIGS. 1 and 2.

FIG. 1 illustrates the environment and setup of the invention. A commercially available weldhead 40 such as an Arc Machines, Inc. (AMI) Model 87 weldhead is mounted on a platform near a pressure vessel 42 containing tubes to be removed (not shown). Weldhead 40 is connected to a snorkel 44 which is capable of conveying electrical power, coolant such as water and inert gas such as argon to the torch assembly 1. Snorkel 44 is long enough to extend through a manhole 46 in the pressure vessel 42, and into a sleeve 48 having an inwardly directed proximity switch 50. A tubular guide 52 is mounted to the sleeve 48 for receiving and guiding the torch assembly 1 which is shown just emerging from the top of the guide 52. Collars or joints on the torch assembly, to be explained later, interact with the proximity switch 50 to indicate the position of the weld tip contained in the torch assembly. This provides a measure of the progress and position of the weld tip within the tube. Sleeve 48 and guide 52 are mounted on a known remote manipulator 60 which is capable of bringing the guide 52 under any one of the multiple tubes in the tube sheet positioned above the bottom of the pressure container. Referring to FIG. 2, torch assembly 1 comprises a torch base 2 adapted for connection to the weldhead 40 through the snorkel 44, shown in FIG. 1, for receiving electrical power, argon and cooling water. A pair of modified screws 26 which extend through the base 2 and through a base coupling 3, are utilized to attach the torch assembly to an end of the snorkel 44. Base 2 contains passages for the inert gas and coolant which will be described in greater detail in connection with FIG. 3. A base insulator 4 engages around the base coupling 3 and base 2 and is also engaged by the screws 26.

The snorkel side sheath 32 is rotatably mounted to the insulator 4 and retained therein by a retainer 29 which threadably receives the end of sheath 32. A wiper ring 25 provides a seal and rotates around the sheath 32 within an annular space provided in insulator 4. A projection 3a of base coupling 3, extends within the sheath 32 and has an opening which receives an end of a power drive shaft 18. Power drive shaft 18 is closely embraced by a tinned copper tubular braid 19. Braid 19, an end 18a of shaft 18 and the projection 3a of coupling 3, are brazed to each other so that they rotate together as a unit within the sheath 32 which can remain non-rotatable within the tube to be TIG relaxed using the torch.

A first threaded joint or collar 27 has inner threads which threadably engage and couple together a far end of sheath 32 and a near end of a tube sheet section sheath 16. The opposite end of sheath 16 is coupled by a second threaded joint or collar 33 to a swivel 10.

The far end of shaft 18, extends beyond the end of braid 19 and is silver soldered to the torch coupling 5 through radial holes 5a which extend into a blind bore in the torch coupling that receives the end of the drive shaft 18.

A torch nut 28 closely engages onto an end of the torch coupling 5 and fixes the braid 19 to the torch coupling at 34. Swivel 10 rotatably carries a torch head fitting 15 so that the torch coupling 5 can rotate along with the drive shaft 18 and braid 19, relative to the sheaths 16 and 32.

The torch head fitting 15 carries a bottom spacer 7 which supports a pair of washers 13 on opposite sides of a freely rotating centering spring 8 for engaging an inner diameter of a tube to be TIP relaxed. A gas cap 14 is fixed to the end of bottom spacer 7 and is connected by a torch head 6 to the torch coupling 5. Torch head 6 includes a recess 6a and a radially extending tungsten torch tip 12 which is fixed by a tungsten screw within the torch head 6. A socket head cap screw 21 is threaded to the top end of torch head 6 and retains a top spacer 9.

By rotating base 2, the entire structure within the sheaths 16 and 32 is rotated, causing torch tip 12 to rotate around the inner diameter of a tube to be TIG relaxed. A spiral pass or a zig-zag pass is made on the inner diameter of the tube by axial and rotational translation of the torch assembly 1, whereas a vertical pass is made without rotational translation.

As best shown in FIG. 3, base 1 includes three circumferentially spaced inlets. Inlet 70 (one shown) communicates with a radially extending passage 72 which emerges at the center line of the base 2. An O-ring 20 is positioned around the central opening in base 2 and seals this opening with a corresponding opening 74 extending through the center of base coupling 3. A pair of radial bores 76 extend outwardly in the projection 3a and communicate with a pair of axial grooves 78 on the outer surface of projection 3a. Referring also to FIG. 2, with sheath 32 closely engaged around the projection 3a, grooves 76 define a passage for argon or other inert gas which is initially supplied at inlets 70, to enter the elongated conduit space between the braid 19 and the sheaths 32 and 16. The configuration of grooves 76 is best seen in FIG. 4. A pair of holes 80 match with holes in the base 2 for receiving screws 26.

Base 2 also includes an inlet 82 for receiving cooling water which passes through part of the body of base 2 and exits through an outlet (not shown) for return through the weldhead 40, shown at FIG. 1, to a storage tank.

Returning to FIG. 2, the inert gas which propagates along the interior conduit defined by sheaths 32 and 16 reaches a pair of radial bores 5b in the torch coupling 5 over surface grooves 5c and passes through an axial central passage 15a in torch head fitting 15, to one or more further radial bores 6b in torch head 6. The gas then propagates along flattened sides of the torch head 6, within the bottom spacer 7, and reaches the recess 6a. The inert gas thus emerges through an opening 6c positioned around the torch tip 12 for shielding the arc in the TIG relaxation process.

Drive shaft 18 conveys electricity along with braid 19 from base 2, to coupling 5, fitting 15, torch head 6 and torch tip 12.

While a specific embodiment of the invention has been shown and described in detail to illustrate the application of the principles of the invention, it will be understood that the invention may be embodied otherwise without departing from such principles.

What is claimed is:

1. A torch assembly for use in a steam generator tube, comprising:

a base containing a coolant passage for a coolant and an inert gas passage for an inert gas, the base being adapted for connection to a weldhead for supplying electrical power, a coolant and an inert gas to the base;

a sheath mounted for rotation to the base and defining an elongated conduit space extending from the base, the sheath having an outer diameter which is smaller than an inner diameter of a steam generator tube for receiving the sheath;

a drive shaft fixed to the base and extending through the sheath for rotation relative to the sheath, the inert gas passage of the base communicating with the conduit space around the drive shaft for conveying inert gas around the drive shaft;

a gas cap rotatably mounted to an end of the sheath opposite from the base, the gas cap communicating with the conduit space for receiving inert gas from the base and having a radial opening for a torch tip and for discharging inert gas around the torch tip;

a torch tip fixed to an end of the shaft spaced away from the base and engaged within the gas cap, the tip extending into the radial opening in the gas cap, the base, shaft and tip being electrically connected to each other for conveying electricity from the base to the tip to strike an arc torch at the tip, the gas cap having the opening through which the tip extends for supplying inert gas around an arc struck at the tip, the base, drive shaft, cap and tip being rotatable as a unit for movement inside a tube; and centering means connected to the sheath and between the sheath and the torch tip, for centering the sheath in a tube to be TIG relaxed by the torch tip.

2. A torch assembly according to claim 1, wherein the torch tip extends substantially radially with respect to the drive shaft.

3. A torch assembly according to claim 1, including a torch head fixed between the torch tip and the drive shaft, the gas cap extending around the torch head, the centering means comprising a centering spring mounted for rotation with respect to the gas cap, adjacent the torch tip and around the torch head, the centering spring operating radially outwardly for engagement with an inner diameter of a tube for receiving the sheath.

4. A torch assembly according to claim 3, including a base coupling engaged with the base and including a projection for receiving the rotatable sheath, a passage for inert gas in the base coupling, and at least one groove on the outer surface of the base coupling, communicating with the passage in the base coupling, for conveying inert gas to the conduit space of the sheath.

5. A torch assembly according to claim 3, including an electrically conductive braid engaged closely around the drive shaft for assisting in the conveyance of electricity from the base to the torch tip.

6. A torch assembly according to claim 3, including an insulator engaged around the base and rotatably retaining the sheath to the base.

7. A torch assembly according to claim 6, including a base coupling mounted within the insulator and including a projection for rotatably receiving the sheath, the base coupling including a passage for inert gas communicating with the inert gas passage in the base, for conveying inert gas from the base to the conduit space in the sheath.

8. A torch assembly according to claim 7, including a torch coupling connected to one end of the drive shaft spaced away from the base, an opposite end of the drive shaft being fixed to the projection of the base coupling, the torch coupling including a passage for receiving inert gas from the conduit space of the sheath, a torch head for carrying the torch tip connected to the torch coupling for receiving the inert gas, the torch head being partly covered by the gas cap and having a recess spaced inwardly from the gas cap, the torch tip being at the recess of the torch head, the gas cap opening through which the torch tip extends being at the recess so that inert gas is supplied around the torch tip at the recess in the torch head and through the opening in the gas cap.

9. A torch assembly according to claim 8, including a bottom spacer engaged around the torch head and connected to the sheath, the centering spring being engaged for rotation around the bottom spacer, the torch head extending through the bottom spacer and through the gas cap, the gas cap being connected to the bottom spacer.

10. A torch assembly according to claim 9, including a top spacer engaged at an end of the gas cap and fixed to the torch head.

* * * * *